US012645085B2

(12) United States Patent
Wang et al.

(10) Patent No.: US 12,645,085 B2
(45) Date of Patent: Jun. 2, 2026

(54) ELECTRONIC DEVICES WITH LENS POSITIONERS

(71) Applicant: Apple Inc., Cupertino, CA (US)

(72) Inventors: Paul X Wang, Cupertino, CA (US);
Fletcher R Rothkopf, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 248 days.

(21) Appl. No.: 18/334,220

(22) Filed: Jun. 13, 2023

(65) Prior Publication Data

US 2024/0012257 A1     Jan. 11, 2024

Related U.S. Application Data

(60) Provisional application No. 63/388,181, filed on Jul. 11, 2022.

(51) Int. Cl.
*G02B 27/01* (2006.01)
*G02B 7/02* (2021.01)
*G06F 3/01* (2006.01)

(52) U.S. Cl.
CPC ......... *G02B 27/0176* (2013.01); *G02B 7/021* (2013.01); *G02B 7/023* (2013.01);
(Continued)

(58) Field of Classification Search
CPC .... G02B 27/0176; G02B 7/021; G02B 7/023; G02B 27/0179; G02B 2027/0154; G02B 2027/0178; G06F 3/013; G06F 1/163; G06F 3/0346; H04N 13/383; H05K 1/0274; H05K 1/189; H05K 2201/10121; H05K 2201/10151
See application file for complete search history.

(56) References Cited

U.S. PATENT DOCUMENTS

| | | | |
|---|---|---|---|
| 8,079,713 B2 | 12/2011 | Ashkenazi | |
| 10,228,727 B1 | 3/2019 | Pickett | |

(Continued)

FOREIGN PATENT DOCUMENTS

| | | |
|---|---|---|
| CN | 11148773 A | 8/2020 |
| KR | 20210025093 A | 3/2021 |

(Continued)

*Primary Examiner* — James C. Jones

(74) *Attorney, Agent, or Firm* — Treyz Law Group, P.C.; Kendall P. Woodruff

(57) ABSTRACT

A head-mounted device may be provided with displays. The displays and lenses through which images on the displays are viewed may be mounted in optical modules. Lens positioners may be used to move the optical modules toward and away from eye boxes to adjust eye relief distance. Control circuitry may gather sensor data such as motion sensor data from a motion sensor indicating whether the head-mounted device is in free fall and/or image sensor data from a front-facing camera indicating whether the head-mounted device is headed toward a collision with an external surface. The control circuitry may use the lens positioners to automatically increase the eye relief distance in response to sensor data if a collision is predicted. The lens positioners may include solenoids or other actuators. The positions of the lenses may be adjusted without necessarily adjusting a distance between the lens and the display.

20 Claims, 10 Drawing Sheets

(52) U.S. Cl.
     CPC ......... G02B 27/0179 (2013.01); G06F 3/013
            (2013.01); *G02B 2027/0154* (2013.01)

(56)                    References Cited

U.S. PATENT DOCUMENTS

| | | |
|---|---|---|
| 10,495,888 B2 | 12/2019 | Yonekubo et al. |
| 10,649,173 B2 | 5/2020 | Song et al. |
| 10,823,970 B2 | 11/2020 | Franklin et al. |
| 11,137,612 B2 | 10/2021 | Jo et al. |
| 11,175,503 B2 | 11/2021 | Franklin et al. |
| 2011/0242489 A1* | 10/2011 | Reed .................... G02C 13/005 |
| | | 351/227 |
| 2016/0140887 A1 | 5/2016 | Kim |
| 2018/0052327 A1 | 2/2018 | Kamakura |
| 2018/0091805 A1 | 3/2018 | Liang et al. |
| 2019/0369353 A1 | 12/2019 | Franklin et al. |
| 2020/0355919 A1 | 11/2020 | Tao et al. |
| 2021/0080746 A1 | 3/2021 | Mirabella et al. |
| 2021/0325680 A1 | 10/2021 | Maric et al. |
| 2021/0333506 A1 | 10/2021 | Maric et al. |
| 2022/0082843 A1 | 3/2022 | Magyari |

FOREIGN PATENT DOCUMENTS

| | | |
|---|---|---|
| WO | 2017066556 A1 | 4/2017 |
| WO | 2019109318 A1 | 6/2019 |
| WO | 2022026220 A2 | 2/2022 |

* cited by examiner

ELECTRONIC DEVICES WITH LENS POSITIONERS

This application claims the benefit of provisional patent application No. 63/388,181, filed Jul. 11, 2022, which is hereby incorporated by reference herein in its entirety.

FIELD

This relates generally to electronic devices, and, more particularly, to head-mounted electronic devices.

BACKGROUND

Electronic devices may contain components mounted in a housing. Head-mounted devices have structures that allow these devices to be worn on the heads of users.

SUMMARY

A head-mounted device may be provided with displays. The displays and lenses through which images on the displays are viewed from eye boxes may be mounted in optical modules. Lens positioners may be used to move the optical modules toward and away from the eye boxes (along a direction parallel to the optical axes of the lenses) to adjust eye relief distance. The positions of the lenses may be adjusted without necessarily adjusting a distance between the lens and the display.

Control circuitry may gather sensor data such as motion sensor data from a motion sensor indicating whether the head-mounted device is in free fall and/or image sensor data from a front-facing camera indicating whether the head-mounted device is headed toward a collision with an external surface. The control circuitry may use the lens positioners to automatically increase the eye relief distance and move the lenses away from the user's eyes if a collision is predicted based on the sensor data.

The lens positioners may include solenoids or other electromagnetic actuators, pneumatic actuators, mechanical actuators, etc. The lens positioners may include one or more independently controlled actuators mounted to a lens support structure that supports guide members to which the lenses are coupled. The guide members may include guide rails, linkage mechanisms, sliding barrels, shape memory alloys, flexible materials, rotating structures, and/or other lens guiding structures that can be manipulated to adjust the position of the lenses. The lens support structure may align with a nose bridge portion of the housing and the actuators may be used to adjust a distance between the lens support structure and the nose bridge portion of the housing. The lens positioners may include a motor, a shaft that is rotated by the motor, and a nut that engages with the shaft. The nut may have first and second portions that are separable from one another to release left and right optical modules from the lens positioner. The lens may be mounted in a lens basket that expands and retracts along a direction parallel to the optical axis of the lens.

DETAILED DESCRIPTION

An electronic device may have input-output devices for gathering input and providing output. These devices may include optical components such as cameras, displays, and lenses.

Figure 1:
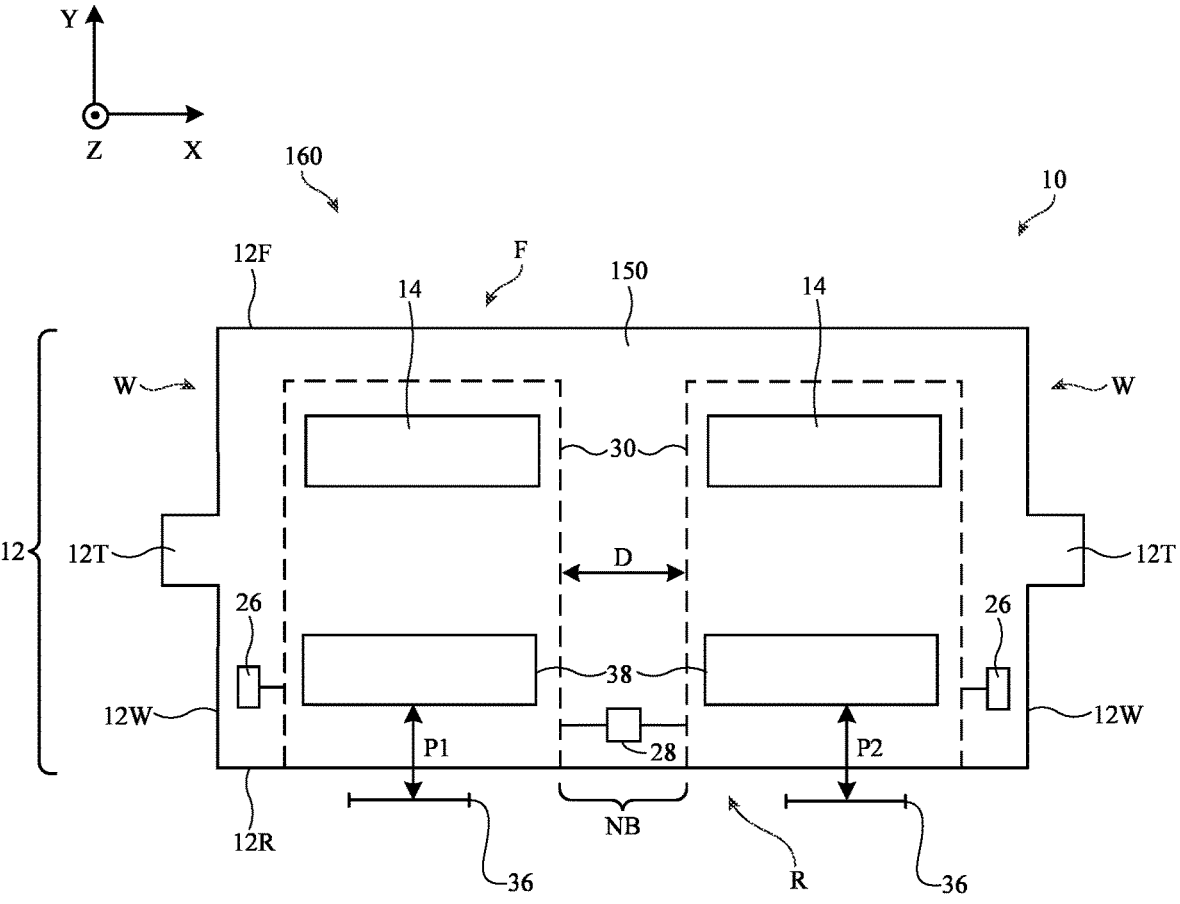
FIG. 1 is a top view of an illustrative electronic device in accordance with an embodiment.

A top view of an illustrative electronic device is shown in FIG. 1. Electronic device 10 of FIG. 1 may be a head-mounted device or other suitable device. As shown in FIG. 1, device 10 may have a housing such as housing 12. Housing 12, which may sometimes be referred to as a housing wall, external housing, housing structures, enclosure, or case, may be formed from materials such as polymer, glass, metal, crystalline materials such as sapphire, ceramic, fabric, foam, wood, other materials, and/or combinations of these materials.

Device 10 may have any suitable shape. Housing 12 may, for example, be configured to form a head-mounted housing in the shape of a pair of goggles (e.g., goggles having optional head straps such as straps 12T, a nose bridge portion in nose bridge region NB that is configured to fit over a user's nose and help support housing 12 on the user's nose, etc.) and/or other head-mounted structures. Housing 12 may separate interior region 150 from exterior region 160. Housing 12 may include portions such as front portion (front wall) 12F on front face F of device 10, rear portion (rear wall) 12R on opposing rear face R of device 10, and sidewall portions such as sidewall portions 12W on sides W that extend between front portion 12F and rear portion 12R, so that housing 12 encloses interior region 150.

Electrical and optical components may be mounted within housing 12 (e.g., in interior region 150). As an example, housing 12 may have optical components in interior region

150 such as displays 14 and lenses 38. Displays 14 and lenses 38 may be mounted in optical modules 30 (sometimes referred to as optical assemblies, lens barrels, display and lens support structures, lens supports, lens support structures, lens baskets, lens housings, etc.). Images from displays 14 may be viewable from eye boxes 36 through lenses 38. A left display and left lens in a left optical module 30 may be used to present a left-eye image to a user's left eye in a left eye box 36 and a right display and right lens in a right optical module 30 may be used to present a right-eye image to a user's right eye in right eye box 36.

Manual adjustment mechanisms and/or electrically adjustable actuators 26 and 28 (e.g., motors, stepper motors, or other electrically adjustable positioners, pneumatic actuators, piezoelectric actuators, linear actuators, electromagnetic actuators, electroactive polymers, incremental dials, etc.) may be used to position optical modules 30. For example, actuators 26 may be used to position optical modules 30 horizontally across the front of the user's face (e.g., to adjust distance D between modules 30 along a direction parallel to the X-axis or nearly parallel to the X-axis of FIG. 1). Optical modules 30 may, for example, be moved closer to each other or farther apart from each other as needed to accommodate different user interpupillary distances. Actuators 28 (sometimes referred to as lens positioners, lens positioning structures, optical module positioning structures, optical assembly positioners, etc.) may be used to position optical modules 30 along a direction parallel to the Y-axis of FIG. 1 (e.g., parallel to the optical axes of lenses 38) to adjust distance P1 between a left optical module 30 (e.g., lens 38 of a left optical module 30) and eye box 36 and distance P2 between right optical module 30 (e.g., lens 38 of right optical module 30) and eye box 36. If desired, a single actuator may be used to move optical modules 30 along the X and Y directions of FIG. 1 (e.g., actuators 26 and 28 may be combined into an actuator that positions modules 30 along one, two, or three linear axes and/or that rotates modules 30 about one or more rotational axes). Arrangements in which actuator 28 is used to adjust distances P1 and P2 between lenses 38 and eye boxes 36 are sometimes described herein as an illustrative example.

Actuator 28 may be used to adjust the position of the entire optical module 30 (e.g., including lens 38 and display 14) without necessarily changing the distance between lens 38 and display 14 (e.g., without changing the focal point, focal distance, or image distance associated with lens 38). In other arrangements, actuator 28 may adjust the position of lens 38 relative to eye box 36 without adjusting the position of display 14 (e.g., by moving lens 38 toward or away from display 14). Arrangements in which actuator 28 adjusts the distance between lens 38 and eye box 36 without adjusting the distance between lens 38 and display 14 are sometimes described herein as an example. If desired, the positions of left and right optical modules 30 relative to respective left and right eye boxes 36 may be adjusted independently of one another (e.g., P1 and P2 may be set to different distances, if desired) or may be adjusted in unison.

The distance between a user's eyes (e.g., at eye boxes 36) and lens 38 may sometimes be referred to as eye relief distance or lens-to-eye distance. The ability to adjust eye relief distance by adjusting how close optical modules 30 are to eye boxes 36 may allow for adjustments to the field of view of device 10 while also providing some protection of the user's eyes in the case of a collision between device 10 and an external surface or object while device 10 is being worn. In some arrangements, optical modules 30 may automatically move away from eye boxes 36 in response to or in preparation for a collision between device 10 and an external surface or object to create additional space between lens 38 and the user's eyes. If, for example, sensor data from motion sensors in device 10 indicates that device 10 is in free fall and sensor data from proximity sensors or other sensors indicates that device 10 is being worn, control circuitry 20 may predict that there is an impending collision between device 10 and the floor. In preparation for this collision, control circuitry 20 may use actuators 28 to move optical modules 30 away from eye boxes 36 and thereby increase the eye relief distance. This helps create a larger gap between lenses 38 and the user's eyes so that lenses 38 do not collide with the user's eyes upon impact. A similar course of action may be taken by control circuitry 20 in response to other types of sensor data indicating a collision or impending collision with an external surface or object. For example, if an outward-facing camera in device 10 detects that device 10 is likely to collide with a wall, a piece of furniture, a person, etc., control circuitry 20 may use actuators 28 to move optical modules 30 away from eye boxes 36 and thereby increase the eye relief distance.

In some arrangements, the Y-position of optical modules 30 (e.g., the position of modules 30 relative to eye boxes 36) may be controlled by a friction fit (e.g., in addition to or instead of using actuators 28 to control the Y-position of modules 30). In this type of scenario, a relatively low force may overcome the friction holding modules 30 in place relative to eye boxes 36 such that collisions between device 10 and an external surface or object would automatically cause modules 30 to retract into housing 12 away from eye boxes 36.

If desired, the position of optical modules 30 relative to eye boxes 36 may be adjusted in response to user input. For example, a user may provide touch input, may rotate a dial or knob, may provide gesture input or voice input, and/or may take other actions to adjust the eye relief distance (sometimes referred to as the Y-position or depth of optical modules 30, the lens-to-eye distance, etc.). The position of modules 30 relative to eye boxes 36 may be continuously adjustable or may be adjustable to discrete locations with predetermined distances. Lenses 38 of optical modules 30 may, for example, be initially set to a maximum eye relief position such as 25 mm from the user's eyes (or other suitable distance). The user may then fine-tune the position of modules 30 relative to eye boxes 36 by providing suitable input to device 10 (e.g., to move lenses 38 from a maximum eye relief position to a full field of view position such as 15 mm or other suitable distance from the user's eyes). This also allows device 10 to be customized for the particular face shape of the user wearing device 10.

Figure 2:
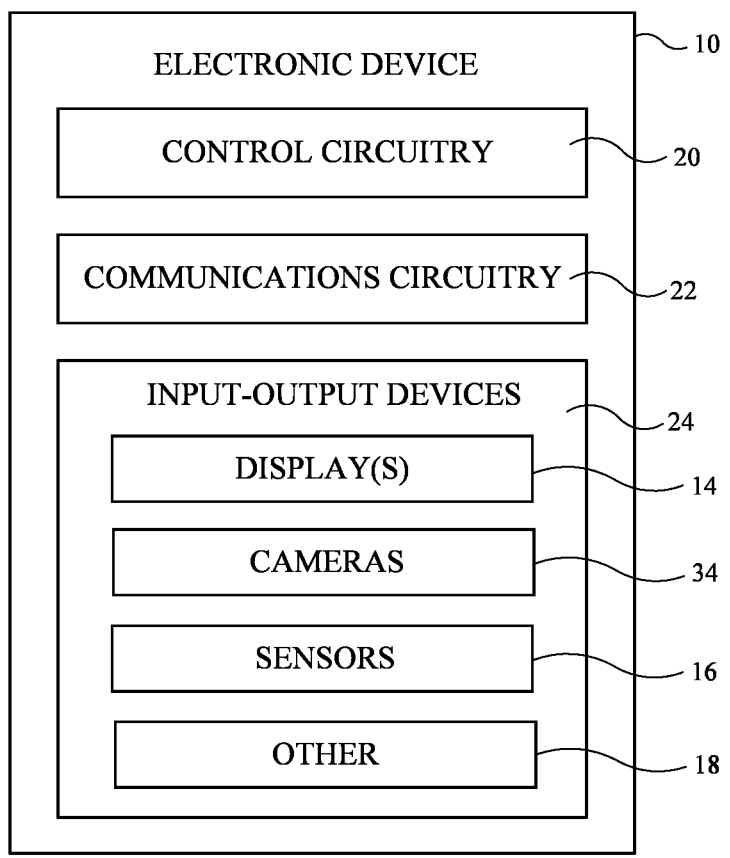
FIG. 2 is a schematic diagram of an illustrative electronic device in accordance with an embodiment.

A schematic diagram of an illustrative electronic device is shown in FIG. 2. Device 10 of FIG. 2 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections) and/or may be used to receive such information from external electronic devices. Each of these external devices may include components of the type shown by device 10 of FIG. 2.

As shown in FIG. 2, electronic device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid-state drive), volatile memory (e.g., static or dynamic random-access-memory), etc. Processing circuitry in control circuitry 20 may be used to gather input from sensors (e.g., cameras) and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device, computer stylus, or other input device, speakers or other output devices, etc.) over a wireless link. For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Electronic components such as input-output devices 24 may be used in gathering user input, in gathering information on the environment surrounding the user, and/or in providing a user with output.

Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Devices 24 may also include cameras 34. Cameras 34 may include visible light cameras, infrared cameras, and/or cameras that are sensitive at multiple wavelengths, may include three-dimensional camera systems such as depth sensors (e.g., structured light sensors and/or depth sensors based on stereo imaging devices that capture three-dimensional images), may include time-of-flight cameras, and/or may include other cameras. Cameras 34 may face toward the user of device 10 and/or away from the user of device 10.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, optical sensors such as self-mixing sensors and light detection and ranging (lidar) sensors, humidity sensors, moisture sensors, gaze tracking sensors, electromyography sensors to sense muscle activation, facial sensors, interferometric sensors, time-of-flight sensors, magnetic sensors, resistive sensors, distance sensors, angle sensors, and/or other sensors. In some arrangements, device 10 may use sensors 16 and/or other input-output devices 24 to gather user input. For example, input-output devices 24 such as buttons may be used to gather button press input, touch sensors overlapping displays can be used for gathering user touch screen input, touch pads may be used in gathering touch input, microphones may be used for gathering audio input (e.g., voice commands), accelerometers may be used in monitoring when a finger contacts an input surface and may therefore be used to gather finger press input, etc.

Input-output devices 24 may include optical components such as depth sensors (e.g., structured light sensors or other sensors that gather three-dimensional image data), optical proximity sensors, ambient light sensors (e.g., color ambient light sensors), optical time-of-flight sensors and other sensors 16 that are sensitive to visible and/or infrared light and that may emit visible and/or infrared light (e.g., devices 24 may contain optical sensors that emit and/or detect light). For example, a visible-light image sensor in a camera may have a visible light flash or an associated infrared flood illuminator to provide illumination while the image sensor captures a two-dimensional and/or three-dimensional image. An infrared camera such as an infrared structured light camera that captures three-dimensional infrared images may have an infrared flood illuminator that emits infrared flood illumination and/or may have a dot projector the emits an array of infrared light beams. Infrared proximity sensors may emit infrared light and detect the infrared light after the infrared light has reflected from a target object.

If desired, electronic device 10 may include additional components (see, e.g., other devices 18 in input-output devices 24). The additional components may include haptic output devices, actuators for moving movable structures in device 10, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Figure 3:
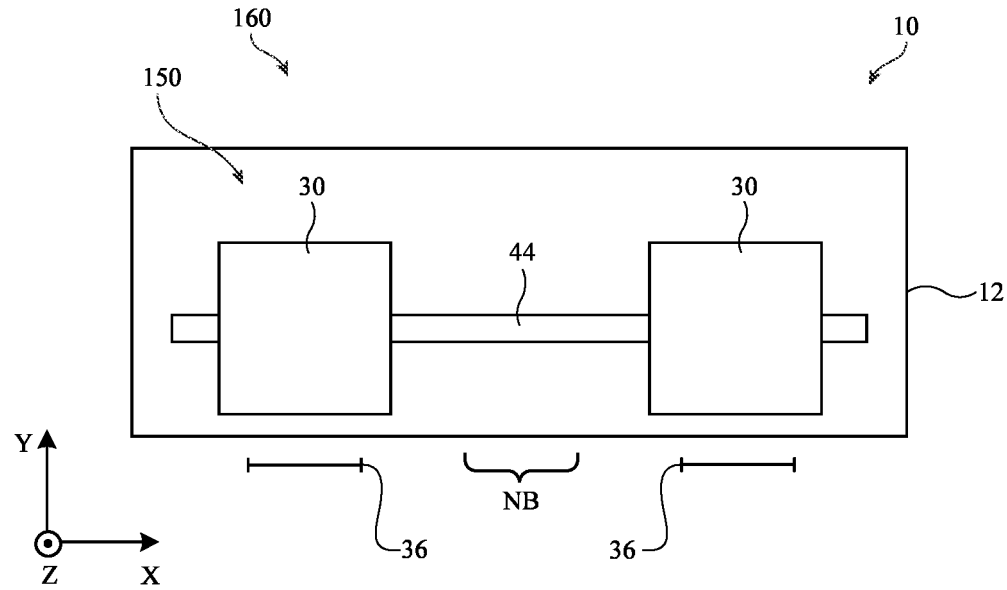
FIG. 3 is top view of an illustrative electronic device with optical module guide members in accordance with an embodiment.

To help maintain desired alignment between optical modules 30 as optical modules 30 are moved by actuators 26 (FIG. 1), optical modules 30 may be mounted on optical module guiding structures such as guide rails, other elongated support members, and/or other guide members that can be manipulated to adjust the position of optical modules 30. This type of arrangement is shown in the top view of device 10 of FIG. 3. As shown in FIG. 3, optical modules 30 may be coupled to guide members 44 to allow modules 30 to move horizontally (e.g., laterally along the X-axis to accommodate different user interpupillary distances). Guide members 44 may include guide rails, linkage mechanisms, sliding barrels, shape memory alloys, flexible materials, rotating structures, and/or other suitable lens guiding structures. Arrangements in which guide members 44 are guide rails to which optical modules 30 are slidably coupled may sometimes be described herein as an illustrative example.

Guide rails 44 may have circular cross-sectional shapes (e.g., guide rails 44 may be cylindrical rods) or may have other cross-sectional shapes. Guide rods 44 may be formed from metal, polymer, and/or other materials. Hollow and/or solid members may be used in forming guide rods 44. To help reduce friction between guide rods 44 and optical modules 30, guide rods 44 and/or mating portions of modules 30 may, if desired, be provided with a low-friction coating (e.g., nickel, etc.).

Figure 4:
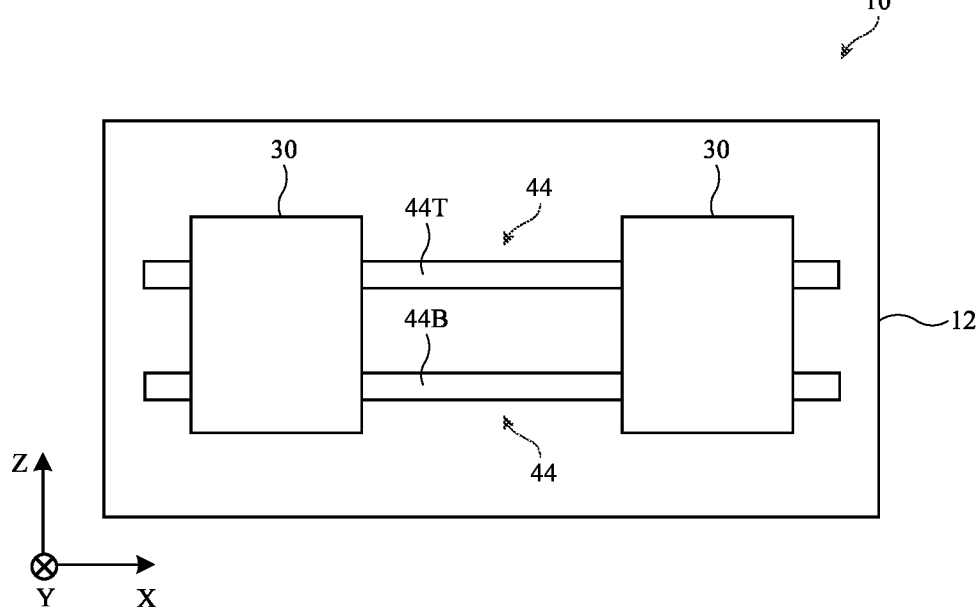
FIG. 4 is a rear view of illustrative electronic device with optical module guide members in accordance with an embodiment.

Guide rails 44 may span the width of housing 12. There may be left and right guide rails 44 in device 10 that are joined at a housing support structure aligned with nose bridge portion NB or left and right guide rails 44 may be formed as integral portions of a single guide rail member that extends across housing 12. Rails 44 may be straight or may, if desired, have a slight bend at nose bridge portion NB (e.g., to take the left and right sides of the guide rails backwards slightly to conform to the shape of a user's face). As shown in the rear view of device 10 of FIG. 4, there may be upper and lower guide rails 44 on the left and right of device such as upper guide rail 44T and lower guide rail 44B. Arrangements with fewer guide rails or more guide rails may be used, if desired.

Figure 5:
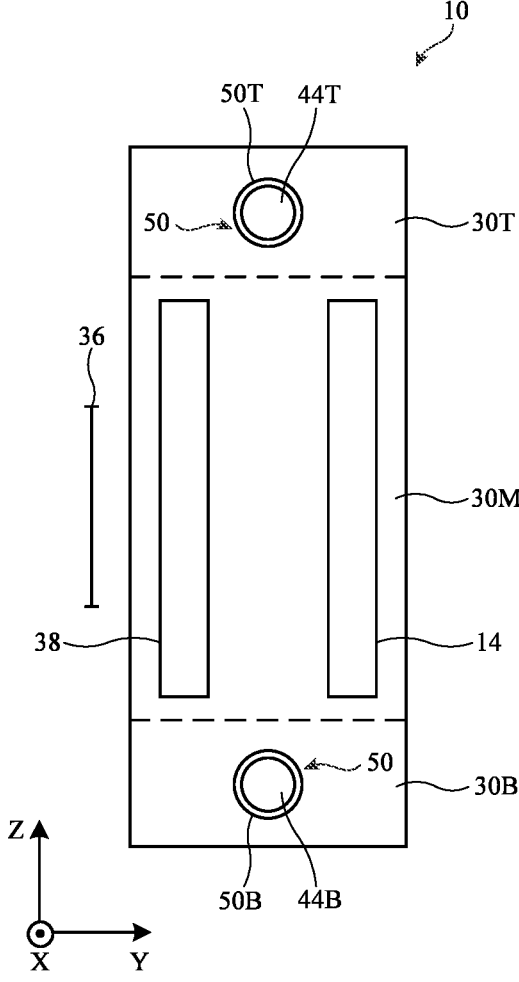
FIG. 5 is a side view of an illustrative optical module with guide members in accordance with an embodiment.

FIG. 5 is a side view of an illustrative optical module 30 mounted on guide rails 44. In the example of FIG. 5, optical module 30 has an upper portion such as portion 30T and a lower portion such as portion 30B. Portions 30T and/or 30B may be integrally formed with main supporting structure 30M of the lens barrel structures and/or other support structures of optical module 30 and/or may be separate members that are coupled (e.g., using welds, fasteners, adhesive, etc.) to main supporting structure 30M. Lens 38 may be aligned with display 14 so that an image on display 14 may be viewed through lens 38 from eye box 36.

As shown in FIG. 5, optical module 30 may have portions that receive and couple to guide rails 44 while allowing optical module 30 to slide along guide rails 44. For example, upper portion 30T may have a guide rail opening (optical module opening) 50 such as opening that receives upper guide rail 44T and lower portion 30B may have a guide rail opening such as opening 50B that receives lower guide rail 44B. Openings 50T and 50B may by cylindrical openings with circular cross-sectional shapes that receive the cylindrical members forming rails 44T and 44B and/or may have other shapes that partly or fully surround rails 44T and 44B.

Figure 6:
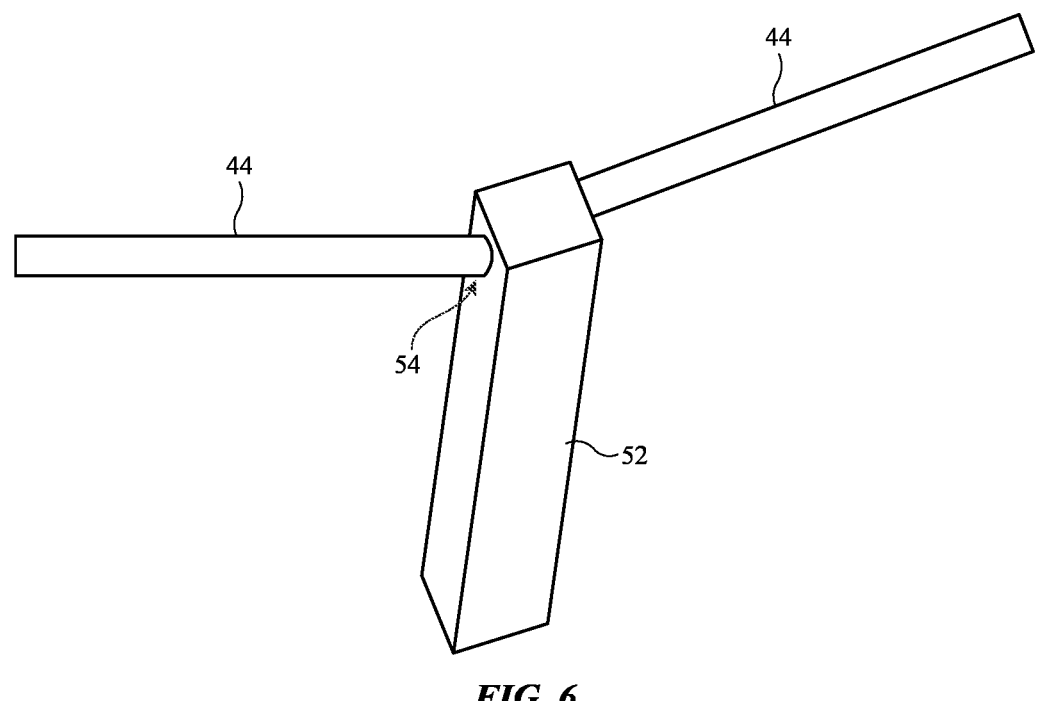
FIG. 6 is a perspective view of an illustrative optical module support structure for supporting optical module guide members in accordance with an embodiment.

As shown in FIG. 6, guide rails may include left and right guide rails 44 that are joined at a housing support structure such as optical module support structure 52. Optical module support structure (sometimes referred to as a guide rail support structure, a lens support structure, lens support, etc.) may be aligned with nose bridge portion NB of housing 12 and may be configured to overlap a user's nose when device 10 is worn on the user's head. Guide rails 44 may be received within respective openings in support structure 52 such as opening 54. For example, a first opening 54 in a first side of support structure 52 may receive left guide rail 44 and a second opening 54 in an opposing second side of support structure 52 may receive right guide rail 44. Guide rails 44 may be perpendicular or nearly perpendicular to optical support structure 52, if desired.

Optical module positioning structures such as actuator 28 may be coupled directly to optical modules 30, may be coupled to optical module support structure 52, may be coupled to guide rails 44, may be coupled to lenses 38 and/or display 14, may be coupled to a cylindrical lens barrel housing in which lenses 38 are mounted, and/or may be coupled to other structures in device 10. Optical modules 30 (e.g., lens 38 and/or display 14 of optical modules 30) may be adjustable along a direction that is parallel to the optical axes of lenses 38. If desired, optical modules 30 may slide along linear tracks (e.g., additional guide rails) extending parallel to the optical axes of lenses 38 (e.g., perpendicular to guide rails 44) or may be moved without sliding along a track.

Figure 7:
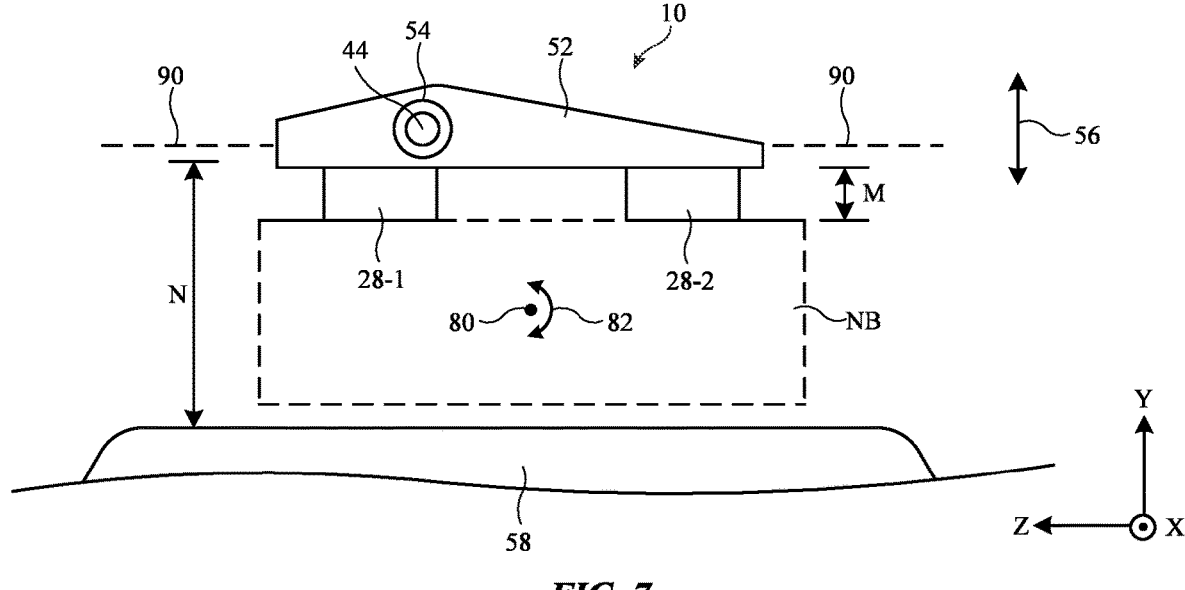
FIG. 7 is a side view of an illustrative electronic device having optical module positioning structures in accordance with an embodiment.

FIG. 7 is a side view of device 10 showing an illustrative example in which optical module positioning structures are located on optical module support structure 52. As shown in FIG. 7, optical module support structure 52 may be aligned with nose bridge portion NB of housing 12. When device 10 is mounted on a user's head, nose bridge portion NB and optical module support structure 52 may align with and overlap a user's nose such as nose 58. Control circuitry 20 may adjust the position of optical modules 30 relative to the user's eyes by adjusting optical module positioning structures 28.

Optical module positioning structures 28 may include one or more actuators (e.g., electromagnetic actuators such as solenoids, piezoelectric actuators, motors, and/or other actuators), rack-and-gear mechanisms, worm gears, rotating shafts, pin-and-slot structures, sliding members, magnets, and/or other positioning structures. Optical module positioning structures 28 may be configured to expand and contract in the Y-direction (e.g., along direction 56 of FIG. 7 which is parallel to the optical axes of lenses 38) to increase or decrease the distance M between optical module support structure 52 and nose bridge housing portion NB. This in turn adjusts the distance N between support structure 52 and nose 58 (as well as distances P1 and P2 of FIG. 1 between optical modules 30 and eye boxes 36).

When it is desired to increase the distance between optical modules 30 and a user's face (e.g., to increase eye relief distance to protect a user's eyes in response to sensor data signaling an impending collision to device 10), control circuitry 20 may expand optical module positioning structures 28 to move optical module support structure 52 (and optical modules 30 which are attached to rails 44 on support structure 52) away from nose bridge housing portion NB and away from the user's face. When it is desired to decrease the distance between optical modules and a user's face (e.g., to increase the field of view in response to user input, sensor data, and/or other information), control circuitry 20 may retract optical module positioning structures 28 to move optical module support structure 52 (and optical modules 30 which are attached to rails 44 on support structure 52) toward nose bridge housing portion NB and toward the user's face.

In the example of FIG. 7, optical module positioning structures 28 include first and second optical module positioning structures 28-1 and 28-2. Optical module positioning structures 28-1 and 28-2 may be located on different portions of optical module support structure 52 such as different locations along longitudinal axis 90 of support structure 52. Optical module positioning structures 28-1 and 28-2 may be independently controlled actuators or may be controlled in unison with one another. In arrangements where optical module positioning structures 28-1 and 28-2 are independently adjustable, control circuitry 20 may apply different adjustments to optical module positioning structures 28-1 and 28-2 to expand or retract structures 28-1 and 28-2 by different amounts, if desired. This may allow support structure 52 to rotate in directions 82 about a rotational axis such as rotational axis 80 (e.g., an axis that is parallel to the X-axis of FIG. 7). When positioning structure 28-1 is expanded along direction 56 more than positioning structure 28-2, support structure 52 may rotate in a clockwise direction about axis 80 (from the perspective shown in FIG. 7). When positioning structure 28-1 is expanded along direction 56 less than positioning structure 28-2, support structure 52 may rotate in a counterclockwise direction about axis 80. This is merely illustrative. If desired, positioning structures 28-1 and 28-2 may be adjusted in unison, or there may only be a single positioning structure 28 between support structure 52 and nose bridge portion NB.

Figure 8:
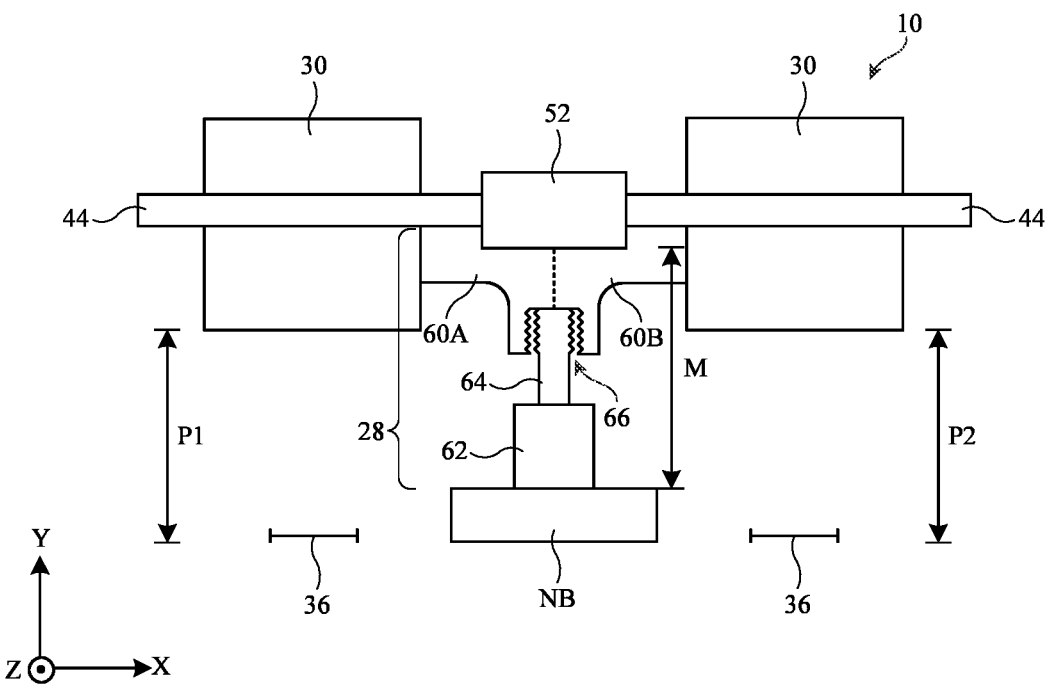
FIG. 8 is a top view of an illustrative electronic device having optical module positioning structures in accordance with an embodiment.
Figure 9:
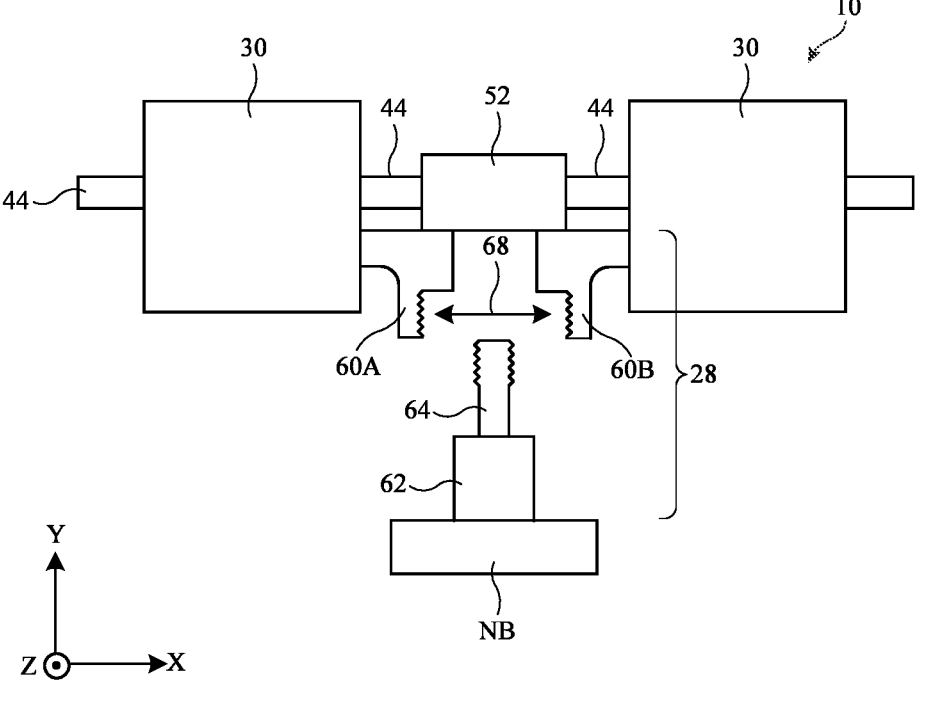
FIG. 9 is a top view of an illustrative electronic device having optical module positioning structures of the type shown in FIG. 8 in a disengaged position to allow independent movement of left and right optical modules in accordance with an embodiment.

FIGS. 8 and 9 are top views of device 10 showing an illustrative example of optical module positioning structures that may be used to position optical modules 30. As shown in FIG. 8, each optical module 30 may be mounted to a respective guide rail 44 (e.g., as discussed in connection with FIGS. 3 and 4). Guide rails 44 may be mounted to optical module support structure 52. Optical module positioning structures 28 may be located between optical module support structure 52 and nose bridge portion NB of housing 12.

Optical module positioning structures 28 may include a motor 62, a shaft 64, and a nut having nut portions 60A and 60B. Shaft 64 and nut portions 60A and 60B may have mating threads 66. Motor 62 may be coupled to nose bridge portion NB, and nut portions 60A and 60B may be coupled to optical module support structure 52 and/or optical modules 30. Nut portions 60A and 60B may, if desired, be separable from one another and may be coupled to respective left and right optical modules 30. When motor 62 rotates shaft 64, nut portions 60A and 60B may travel up or down shaft 64 in directions 56 depending on the direction of rotation. When nut portions 60A and 60B move up shaft 64 away from nose bridge portion NB, the distance M between support structure 52 and nose bridge portion NB increases, as do distances P1 and P2. When nut portions 60A and 60B move down shaft 64 toward nose bridge portion NB, the distance M between support structure 52 and nose bridge portion NB decreases, as do distances P1 and P2 between optical modules 30 and eye boxes 36. Control circuitry 20 may therefore control how close the user's eyes are to lenses 38 by applying appropriate control signals to motor 62 of positioning structures 28.

If desired, optical modules 30 may disengage from optical module positioning structures 28 when optical module positioning structures 28 are no longer actively positioning optical modules 30. For example, as shown in FIG. 9, nut portions 60A and 60B may disengage from shaft 64 and separate from one another in directions 68. When optical modules 30 are released from optical module positioning structure 28, optical modules 30 may be free to move relative to one another (e.g., along the X-direction of FIG. 9 to adjust interpupillary distance). When it is desired to make Y-position adjustments, nut portions 60A and 60B may engage with shaft 64 so that motor 62 can adjust the Y-position of modules 30 and thereby adjust the distance between modules 30 and eye boxes 36. If desired, the engaging and disengaging between nut portions 60A and 60B and shaft 64 may be controlled by a magnetic drive mechanism or other suitable mechanism. Control circuitry 20 may control the release of optical modules 30 from positioner 28 in response to user input and/or sensor data such as motion sensor data from a motion sensor (e.g., an accelerometer, a gyroscope, a compass, etc.), image sensor data from a front-facing or rear facing camera in device 10, and/or other sensor data.

Figure 10:
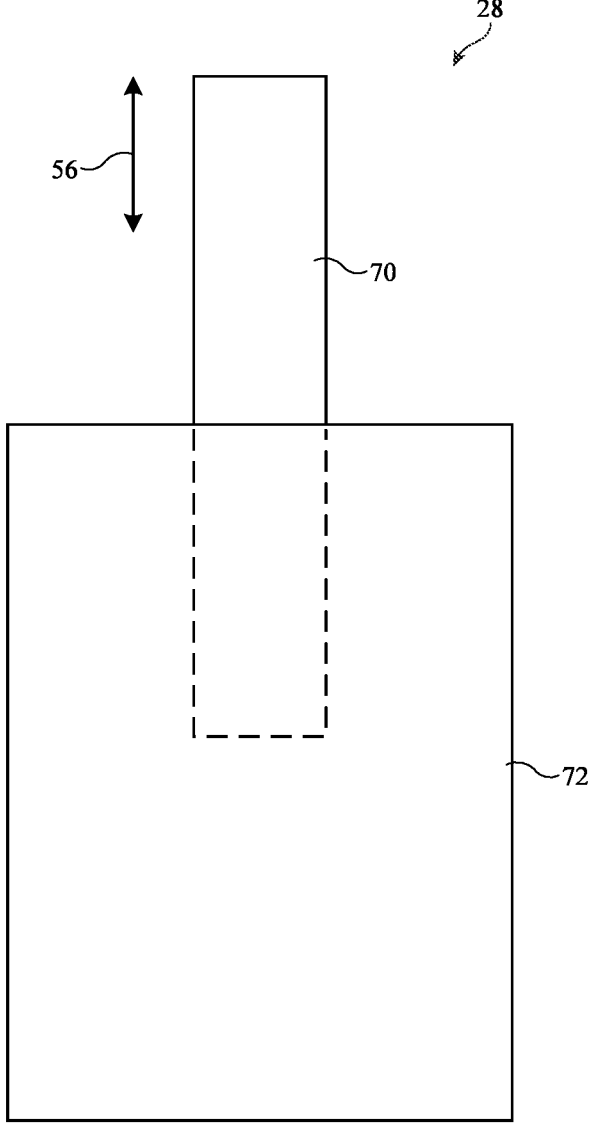
FIG. 10 is a side view of illustrative optical module positioning structures in accordance with an embodiment.

FIG. 10 is a side view of an illustrative actuator that may be used in optical module positioning structures 28. As shown in FIG. 10, optical module positioning structures 28 may include a solenoid (sometimes referred to as a pull solenoid) having a shaft 70 that moves into and out of the center of a coil such as coil 72. Coil 72 may be formed from copper or other suitable metal. Shaft 70 (sometimes referred to as a plunger) may be formed from a ferromagnetic material. When a current is applied to coil 72, a magnetic field is created which causes shaft 70 to be pulled into the center of coil 72. In this way, shaft 70 may be configured to move relative to coils 72 in directions 56 (e.g., a direction parallel to the optical axis of lens 38). Optical module positioning structures 28 may be located between optical module support structure 52 and nose bridge portion NB (as shown in FIG. 7), may be placed between each optical module 30 and rear housing 12R, and/or may be placed in other suitable locations to adjust the position of optical modules 30 relative to eye boxes 36 and the user's face (e.g., to retract lenses 38 inward into housing 12 to increase eye relief distance or to move lenses 38 outward toward the user's eyes to increase field of view and decrease eye relief distance).

Figure 11:
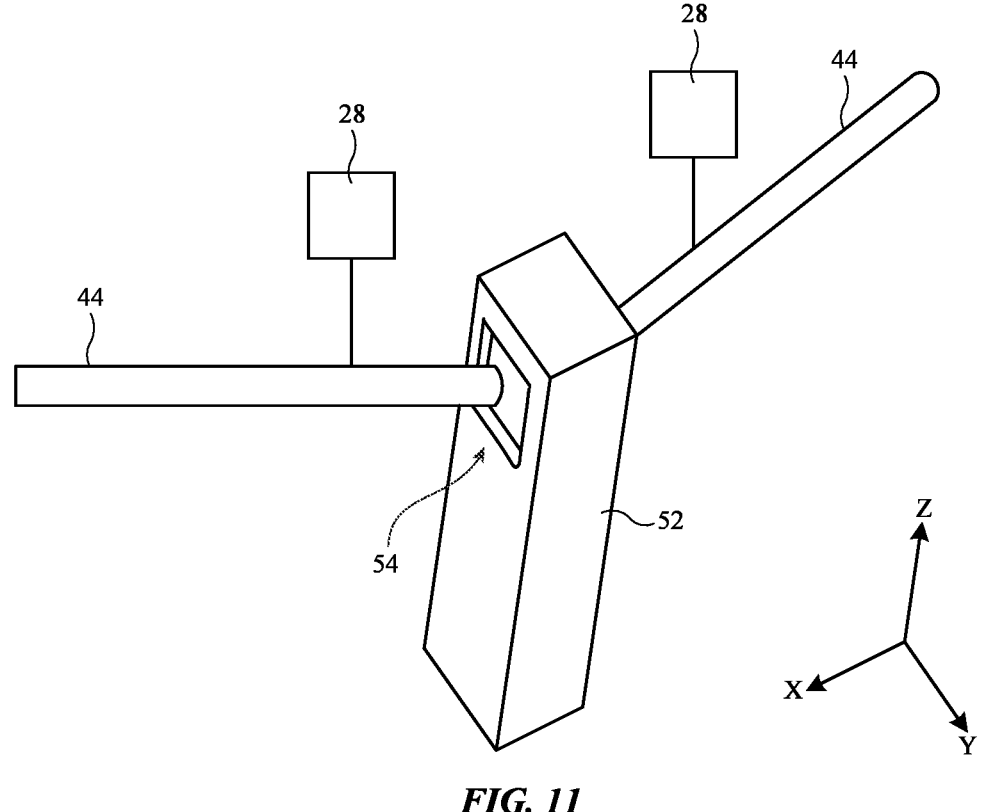
FIG. 11 is a perspective view of illustrative optical module guide members configured to slide within respective slots in an optical module support structure in accordance with an embodiment.

FIG. 11 shows an example in which the position of optical modules 30 relative to the user's face are adjusted by adjusting the position of guide bars 44 relative to optical module support structure 52. As shown in FIG. 11, optical module support structure 52 may include openings such as openings 54 for receiving guide bars 44. Opening 54 may be a slot that extends parallel to the Y-axis of FIG. 11. This allows guide bars 44 to move back and forth along the Y-direction (e.g., parallel to the optical axes of lenses 38) to adjust the Y-position of optical modules 30 relative to the user's face. For example, optical module positioning structures 28 may include actuators that move guide bars within slot 54 to achieve the desired distance between optical modules 30 and eye boxes 36.

Figure 12:
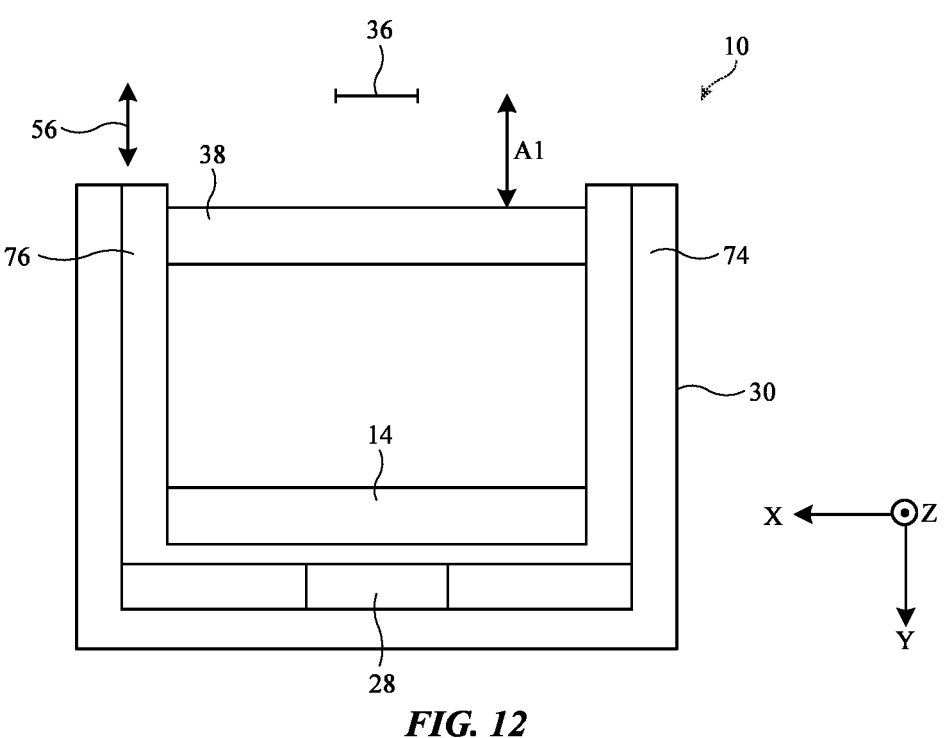
FIG. 12 is a top view of an illustrative optical module in a retracted position in accordance with an embodiment.
Figure 13:
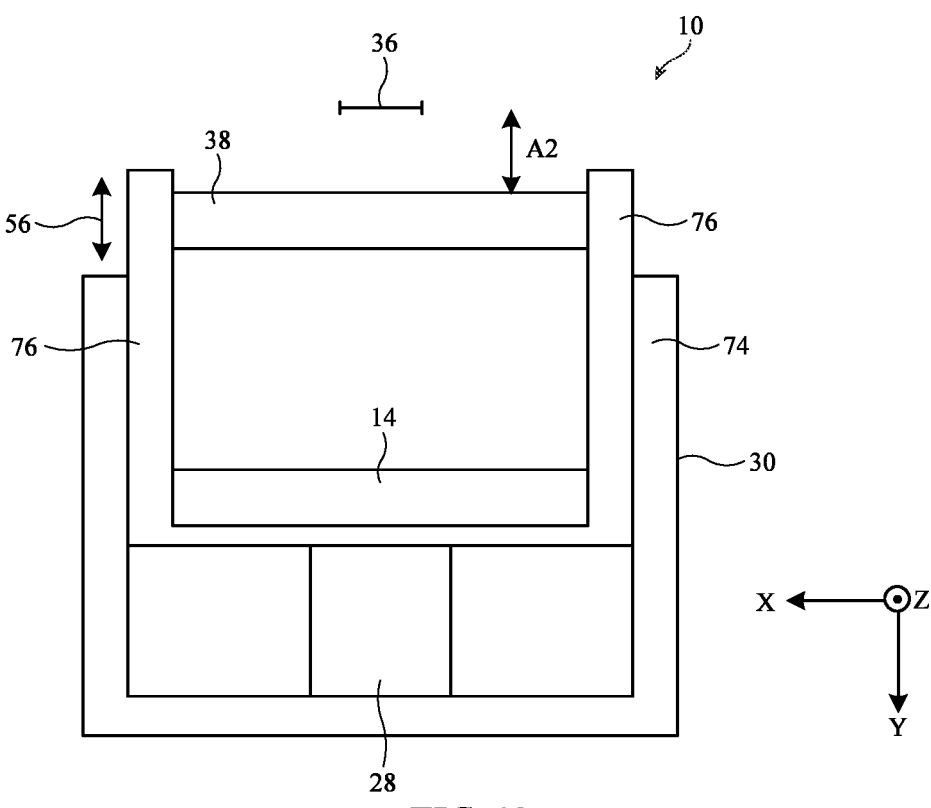
FIG. 13 is a top view of the illustrative optical module of FIG. 12 in an expanded position in accordance with an embodiment.

FIGS. 12 and 13 are top views of device 10 showing an illustrative example in which optical modules 30 include retractable support structures such as telescoping support structures. As shown in the retracted state of FIG. 12, optical module 30 may include outer support structure 74 (sometimes referred to as a lens basket, lens barrel, cylindrical lens housing, etc.). Outer support structure 74 may have cylindrical sidewalls that surround lens 38 (and display 14, if desired). Display 14 and lens 38 may be mounted to an inner cylindrical support structure such as inner support structure 76 that fits inside of outer support structure 74. Inner support structure 76 may be movable relative to outer support structure 74. To control the position of inner support structure 76 relative to outer support structure 74, optical module positioning structures 28 may include an actuator that moves inner support structure 76 in directions 56 (e.g., a direction parallel to the optical axis of lens 38) relative to outer support structure 74. As actuator 28 moves inner support structure 76 relative to outer support structure 74, display 14 and lens 38 may move with inner support structure 76.

In the retracted state of FIG. 12, inner support structure 76 is located inside of outer support structure 74. Eye box 36 and lens 38 may be separated by a first distance A1. Distance A1 may correspond to a maximum eye relief distance or other suitable distance. When it is desired to decrease the distance between eye box 36 and lens 38, actuator 28 may push inner support structure 76 outward in a direction parallel to the Y-axis of FIG. 12 and parallel to the optical axis of lens 38. This causes inner support structure 76 to move out of outer support structure 74, as shown in FIG. 13. In the expanded state of FIG. 13, inner support structure 76 is located at least partially outside of outer support structure 74, and eye box 36 and lens 38 may be separated by a second distance A2 that is smaller than A1. Distance A2 may be used when an optimal field of view is desired and maximum eye relief is not needed, for example. In this way, control circuitry 20 may adjust the position of lens 38 relative to eye box 36 by using actuator 28 to move inner support structure 74 (including display 14 and lens 38 therein) relative to outer support structure 76.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is illustrative and various modifications can be made to the described embodiments. The foregoing embodiments may be implemented individually or in any combination.

What is claimed is:

1. A head-mounted device, comprising:
a head-mounted support structure having a guide member;
a lens coupled to the guide member and having an optical axis;
a display coupled to the guide member and configured to provide an image viewable through the lens from an eye box;
a lens positioner configured to adjust a position of the lens relative to the eye box along a direction that is parallel to the optical axis of the lens without changing a distance between the lens and the display;
a sensor configured to gather sensor data; and
control circuitry configured to use the lens positioner to adjust the position of the lens along the direction in response to the sensor data.

2. The head-mounted device defined in claim 1 wherein the sensor comprises a motion sensor and wherein the sensor data indicates whether the head-mounted device is in free fall.

3. The head-mounted device defined in claim 2 wherein the control circuitry uses the lens positioner to adjust the position of the lens to increase an eye relief distance in response to the sensor data indicating that the head-mounted device is in free fall.

4. The head-mounted device defined in claim 1 wherein the sensor comprises an outward-facing camera and wherein the sensor data indicates whether the head-mounted device is headed toward a collision with an external surface.

5. The head-mounted device defined in claim 4 wherein the control circuitry uses the lens positioner to adjust the position of the lens to increase an eye relief distance in response to the sensor data indicating that the head-mounted device is headed toward a collision with an external surface.

6. The head-mounted device defined in claim 1 wherein the lens positioner is selected from the group consisting of: an electromagnetic actuator, a pneumatic actuator, and a mechanical actuator.

7. The head-mounted device defined in claim 1 further comprising:

a lens support structure having an opening that receives the guide member, wherein the lens positioner is located on the lens support structure, wherein the head-mounted support structure comprises a nose bridge portion, and wherein the lens support structure is aligned with the nose bridge portion.

8. The head-mounted device defined in claim 1 wherein the guide member comprises a lens guiding structure selected from the group consisting of: a guide rail, a linkage mechanism, a sliding barrel, a shape memory alloy, a flexible material, and a rotating structure.

9. The head-mounted device defined in claim 1 wherein the lens is mounted in a lens basket and wherein the lens positioner is configured to expand and retract the lens basket along the direction to adjust the position of the lens relative to the eye box.

10. A head-mounted device, comprising:
a head-mounted support structure;
a lens support structure mounted in the head-mounted support structure;
a lens coupled to the lens support structure and having an optical axis;
a display coupled to the lens support structure and configured to provide an image viewable through the lens from an eye box;
an actuator configured to control a position of the lens; and
control circuitry configured to use the actuator to adjust an eye relief distance between the lens and the eye box based on sensor data.

11. The head-mounted device defined in claim 10 further comprising a motion sensor that gathers the sensor data, wherein the sensor data indicates whether the head-mounted device is in free fall, and wherein the control circuitry uses the actuator to increase the eye relief distance in response to the sensor data indicating that the head-mounted device is in free fall.

12. The head-mounted device defined in claim 10 further comprising an outward-facing camera that gathers the sensor data, wherein the sensor data indicates whether the head-mounted device is headed toward a collision with an external surface, and wherein the control circuitry uses the actuator to increase the eye relief distance in response to the sensor data indicating that the head-mounted device is headed toward a collision with an external surface.

13. The head-mounted device defined in claim 10 wherein the actuator adjusts the eye relief distance without changing a distance between the lens and the display.

14. The head-mounted device defined in claim 10 wherein the control circuitry is configured to use the actuator to adjust the eye relief distance in response to user input.

15. A head-mounted device, comprising:
a head-mounted support structure having a nose bridge portion;
a lens support structure aligned with the nose bridge portion;
left and right guide rails coupled to the lens support structure;
left and right lenses coupled respectively to the left and right guide rails; and
lens positioning structures configured to adjust a distance between the lens support structure and the nose bridge portion.

16. The head-mounted device defined in claim 15 wherein the lens positioning structures comprise first and second independently controlled actuators.

17. The head-mounted device defined in claim 15 wherein the left and right guide rails are configured to slide within respective slots located in the lens support structure.

18. The head-mounted device defined in claim 15 wherein the lens positioning structures comprise a motor, a rotating shaft, and a nut that engages with the rotating shaft.

19. The head-mounted device defined in claim 18 wherein the nut has first and second portions that separate from one another to release the left and right lenses from the motor.

20. The head-mounted device defined in claim 15 further comprising:

left and right displays respectively coupled to the left and right guide rails.

\* \* \* \* \*